US008219720B2

(12) United States Patent
Saint-Hilaire et al.

(10) Patent No.: US 8,219,720 B2
(45) Date of Patent: *Jul. 10, 2012

(54) METHOD AND ARCHITECTURE TO SUPPORT INTERACTION BETWEEN HOST COMPUTER AND REMOTE DISPLAY DEVICES WHEREIN SERVICE-SPECIFIC PROTOCOLS FOR THE REMOTE DEVICES ARE DEFINED

(75) Inventors: Ylian Saint-Hilaire, Hillsboro, OR (US); Jim W. Edwards, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,907

(22) Filed: Aug. 27, 2009

(65) Prior Publication Data
US 2009/0319695 A1    Dec. 24, 2009

Related U.S. Application Data

(60) Continuation of application No. 11/506,370, filed on Aug. 17, 2006, now Pat. No. 7,716,385, which is a division of application No. 09/989,136, filed on Nov. 20, 2001, now Pat. No. 7,299,304.

(51) Int. Cl.
G06F 13/00 (2006.01)
G06F 3/00 (2006.01)

(52) U.S. Cl. ........... 710/11; 710/8; 710/10; 710/15; 348/1.1; 348/158; 348/468; 715/730; 715/810; 455/420; 709/220

(58) Field of Classification Search ........... 710/8, 10, 710/11, 15; 345/1.1; 709/220; 715/730
See application file for complete search history.

(56) References Cited

U.S. PATENT DOCUMENTS

| 5,636,211 | A  | 6/1997  | Newlin et al. |
| 5,880,732 | A  | 3/1999  | Tryding       |
| 6,169,725 | B1 | 1/2001  | Gibbs et al.  |
| 6,349,352 | B1 | 2/2002  | Lea           |
| 6,460,030 | B1 | 10/2002 | Ludtke        |
| 6,542,200 | B1 | 4/2003  | Barcy et al.  |

(Continued)

OTHER PUBLICATIONS

Universal Plug and Play in Windows XP, published Jul. 1, 2001, updated Aug. 8, 2001, pp. 1-22.*

(Continued)

*Primary Examiner* — Tammara Peyton
(74) *Attorney, Agent, or Firm* — Blakely, Sokoloff, Taylor & Zafman LLP

(57) ABSTRACT

A method and architecture for enabling interaction between a remote device and a host computer. A service provided by the remote device is discovered, and a description pertaining to the service is retrieved by the host computer. A network communication link is the established between the remote device and the host computer based on connection information provided by the description. Host-side and client-side software service modules are run on the host and remote devices to enable interaction between the devices using a service protocol that is specific to the service. Various service protocols are provided, including a display service protocol and an input service protocol. Using commands provided by each protocol, the host computer is enabled to control the service remotely by pushing data and appropriate commands to the remote device, whereupon these commands are processed by the client-side service module to perform service operations that employ the sent data.

7 Claims, 11 Drawing Sheets

U.S. PATENT DOCUMENTS

| | | | |
|---|---|---|---|
| 6,556,217 | B1 | 4/2003 | Makipaa et al. |
| 6,622,018 | B1 | 9/2003 | Erekson |
| 6,711,630 | B2 | 3/2004 | Dubal et al. |
| 7,110,952 | B2 | 9/2006 | Kursh |
| 7,130,895 | B2 * | 10/2006 | Zintel et al. .................. 709/220 |
| 7,143,328 | B1 | 11/2006 | Altmann |
| 7,221,405 | B2 | 5/2007 | Basson et al. |
| 7,257,821 | B2 | 8/2007 | Wendorf et al. |
| 7,312,813 | B1 | 12/2007 | Heinonen |
| 7,337,402 | B2 * | 2/2008 | Milton et al. ................. 715/730 |
| 7,580,005 | B1 * | 8/2009 | Palin .............................. 345/1.1 |
| 2002/0078259 | A1 | 6/2002 | Wendorf et al. |
| 2002/0102998 | A1 | 8/2002 | Lin |
| 2003/0035074 | A1 | 2/2003 | Dubil et al. |
| 2003/0046557 | A1 | 3/2003 | Miller et al. |
| 2003/0063608 | A1 | 4/2003 | Moonen |
| 2003/0117433 | A1 | 6/2003 | Milton et al. |
| 2003/0163542 | A1 | 8/2003 | Bulthuis et al. |

OTHER PUBLICATIONS

"Universal Plug and Play Device Architecture", Microsoft Corporation, Version 1.0, Jun. 2000, pp. 1-53.

"Understanding Universal Plug and Play", Operating System, Microsoft Windows Me Millennium Edition, pp. 1-39.

Richard III et al., "Service Advertisement and Discovery: Enabling Universal Device Cooperation", IEEE Internet Computing, Sep.-Oct. 2000, pp. 18-26.

Non-Final Office Action for U.S. Appl. No. 09/989,136, mailed on Oct. 4, 2004, 11 pages.

Response for Non-Final Office Action for U.S. Appl. No. 09/989,136, filed Feb. 7, 2005, 16 pages.

Final Office Action for U.S. Appl. No. 09/989,136, mailed on Jun. 16, 2005, 14 pages.

Response for Final Office Action for U.S. Appl. No. 09/989,136, filed Sep. 19, 2005, 17 pages.

Non-Final Office Action for U.S. Appl. No. 09/989,136, mailed on Jan. 24, 2006, 9 pages.

Response for Non-Final Office Action for U.S. Appl. No. 09/989,136, filed Apr. 27, 2006, 19 pages.

Non-Final Office Action for U.S. Appl. No. 09/989,136, mailed on Oct. 18, 2006, 5 pages.

Response for Non-Final Office Action for U.S. Appl. No. 09/989,136, filed Jan. 22, 2007, 19 pages.

Final Office Action for U.S. Appl. No. 09/989,136, mailed on Apr. 6, 2007, 7 pages.

Response for Final Office Action for U.S. Appl. No. 09/989,136, filed Jun. 22, 2007, 16 pages.

Notice of Allowance for U.S. Appl. No. 09/989,136, mailed on Jul. 12, 2007, 9 pages.

Non-Final Office Action for U.S. Appl. No. 11/506,370, mailed on Jan. 7, 2009, 8 pages.

Response to Non-Final Office Action for U.S. Appl. No. 11/506,370, filed Apr. 7, 2009, 7 pages.

Final Office Action for U.S. Appl. No. 11/506,370, mailed on Jun. 29, 2009, 12 pages.

Response to Final Office Action for U.S. Appl. No. 11/506,370, filed Oct. 29, 2009, 10 pages.

Non-Final Office Action for U.S. Appl. No. 11/506,345, mailed on Feb. 7, 2008, 9 pages.

Response to Non-Final Office Action for U.S. Appl. No. 11/506,345, filed May 7, 2008, 7 pages.

Notice of Allowance for U.S. Appl. No. 11/506,345, mailed on Jun. 23, 2008, 7 pages.

Non-Final Office Action for U.S. Appl. No. 11/506,393, mailed on Dec. 28, 2007, 8 pages.

Response to Non-Final Office Action for U.S. Appl. No. 11/506,393, filed Mar. 28, 2008, 5 pages.

Notice of Allowance for U.S. Appl. No. 11/506,393, mailed on Aug. 5, 2008, 9 pages.

Supplemental Notice of Allowance for U.S. Appl. No. 11/506,393, mailed on Oct. 8, 2008, 6 pages.

Non-Final Office Action for U.S. Appl. No. 11/893,005, mailed on Aug. 5, 2008, 12 pages.

Response to Non-Final Office Action for U.S. Appl. No. 11/893,005, filed Nov. 5, 2008, 7 pages.

Notice of Allowance for U.S. Appl. No. 11/893,005, mailed on Dec. 11, 2008, 4 pages.

Tomlinson, P., "Plug and Play," Window's Developer's Journal, pp. 1-6 (Dec. 1995).

* cited by examiner

3 DISCOVERY MESSAGES FOR ROOT DEVICE                    120

| | NT | USN |
|---|---|---|
| 1 | ROOT DEVICE UUID | ROOT DEVICE UUID |
| 2 | DEVICE TYPE:DEVICE VERSION | ROOT DEVICE UUID AND :: AND DEVICE TYPE:DEVICE VERSION |
| 3 | UPNP:ROOTDEVICE | ROOT DEVICE UUID AND :: AND UPNP:ROOTDEVICE |

2 DISCOVERY MESSAGES FOR EACH EMBEDDED DEVICE           122

| | NT | USN |
|---|---|---|
| 1 | EMBEDDED DEVICE UUID | EMBEDDED DEVICE UUID |
| 2 | DEVICE TYPE:DEVICE VERSION | EMBEDDED DEVICE UUID AND :: AND DEVICE TYPE:DEVICE VERSION |

1 DISCOVERY MESSAGE FOR EACH SERVICE                    124

| | NT | USN |
|---|---|---|
| 1 | DEVICE TYPE:SERVICE VERSION | EMBEDDED DEVICE UUID AND :: AND SERVICE TYPE:SERVICE VERSION |

*FIG. 7*

METHOD AND ARCHITECTURE TO SUPPORT INTERACTION BETWEEN HOST COMPUTER AND REMOTE DISPLAY DEVICES WHEREIN SERVICE-SPECIFIC PROTOCOLS FOR THE REMOTE DEVICES ARE DEFINED

CROSS-REFERENCE TO RELATED APPLICATIONS

The present application is a continuation of U.S. patent application Ser. No. 11/506,370, entitled "Method and Architecture to Support Interaction Between a Host Computer and Remote Devices," filed Aug. 17, 2006, now pending, which is a divisional of U.S. patent application Ser. No. 09/989,136, entitled "Method and Architecture to Support Interaction Between a Host Computer and Remote Devices," filed Nov. 20, 2001, now U.S. Pat. No. 7,299,304, which is also the parent application for divisional U.S. patent application Ser. No. 11/506,345, filed Aug. 17, 2006, now U.S. Pat. No. 7,444,438, divisional U.S. patent application Ser. No. 11/506,393, filed Aug. 17, 2006, now U.S. Pat. No. 7,464,194, and divisional U.S. patent application Ser. No. 11/893,005, filed Aug. 13, 2007, now U.S. Pat. No. 7,523,225, having the same titles as the parent application, the entirety of which are incorporated by reference in the present application.

BACKGROUND OF THE INVENTION

1. Field of the Invention

The present invention concerns interaction with remote devices in general, and a method and system for performing remote interaction with low-resource devices, including display, playback and synchronization of multimedia content and receiving input from such devices.

2. Background Information

Today, there are several software tools that enable users to interact with a host computer from a remote location through software products running on both a remote computer and the host computer. These software products generally fall under the category of "remote control" software, and include such products as PC Anywhere, Carbon Copy, Windows Terminal Server, and RDP (remote desktop protocol) for Microsoft Windows operating system environments, and X-Windows for UNIX and LINUX environments.

As shown in FIG. 1, these software products typically include a set of client-side software components 10 running on a remote computer 12 that interact with host-side software components 14 running on a host computer 16 via a communication link over a network 18. Notably, the client-side software components require both an operating system (OS) 20 and computer hardware resources components to enable the operating system to run, such as a high speed CPU 22 and memory 24. As a result, remote computer 12 requires both hardware and software (i.e., the OS) components that are fairly expensive. Furthermore, much of the hardware and software components are duplicative when considering that similar hardware and OS software is required for host computer 16.

Recent advancements have also lead to the availability of standalone devices that are used for displaying and/or generating multimedia content. For example, digital picture frames are used to display one or more digital pictures that are stored on a memory media card; in order to change the pictures, the memory media card needs to be changed. Another common stand-alone device is the set-top box, which enables users to receive various multimedia content via a television network (e.g., cable or satellite network), and many models further enable users to access the Internet via a dial-up or cable link.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 comprises a set of three tables presenting tabular information pertaining to discovery messages broadcast during a UPnP discovery step;

DETAILED DESCRIPTION OF THE ILLUSTRATED EMBODIMENTS

A system and method for displaying interacting with remote devices via an extended PC host is described in detail herein. In the following description, numerous specific details are provided, such as exemplary service protocols and system architectures, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a mechanism that enables interaction between a low-cost networked device (i.e., the remote device) and an "extended" personal computer, wherein a majority of the software and hardware components used to enable the interaction are provided by the extended PC, and the remote device requires limited hardware that supports "lightweight" software service components. The extended PC, which is also referred to as a "host" PC herein, is termed "extended" because it extends the reach of a PC in a home environment.

Figure 2:
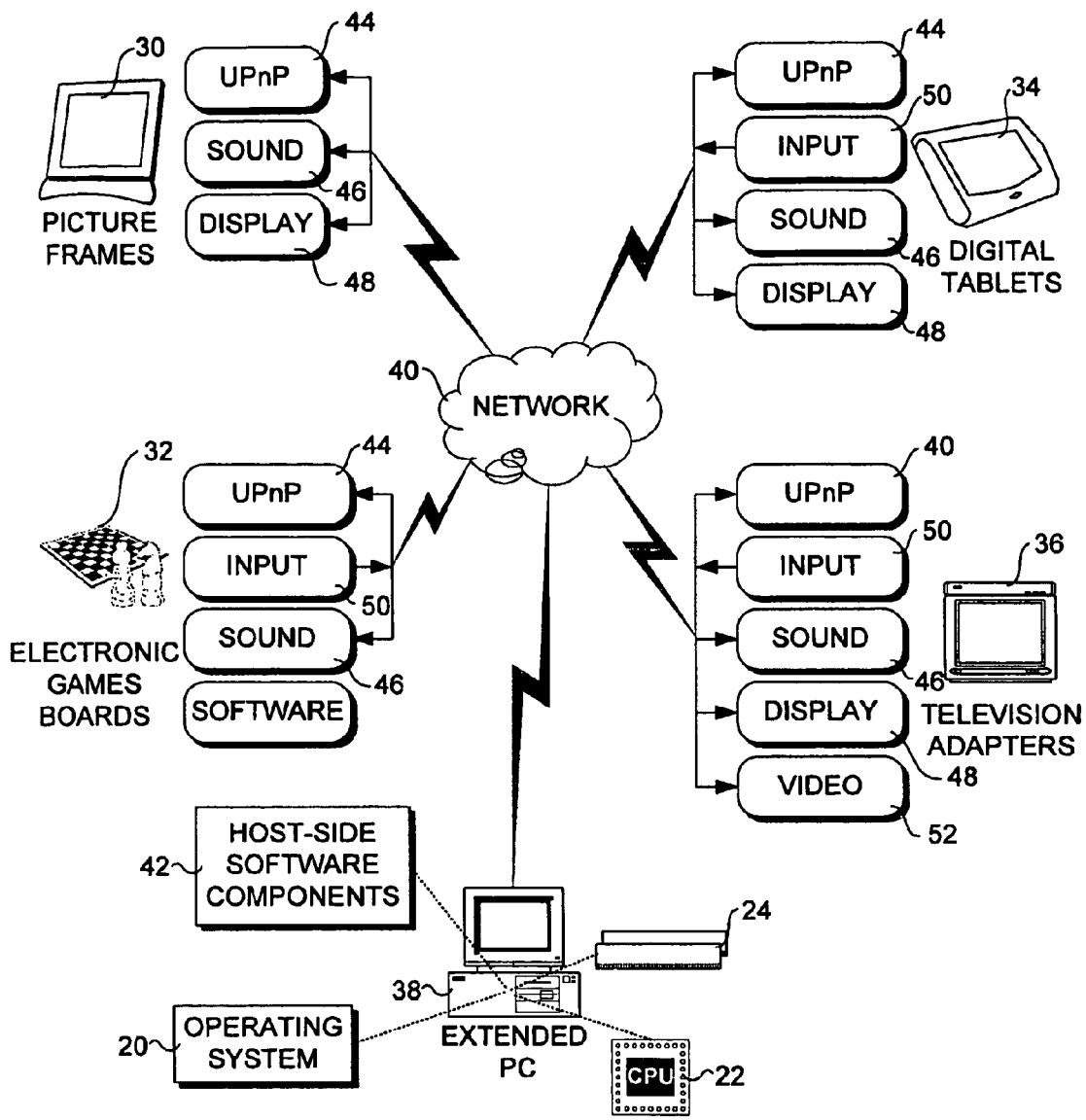
FIG. 2 is a schematic diagram of an exemplary architecture that enables a host or "extended" PC to interact with various remote devices in accordance with the present invention.

As shown in FIG. 2, the present invention enables interaction between a plurality of remote devices, including digital picture frames 30, electronic game boards 32, digital network tables 34 and television adapters 36, and an "extended" personal computer (PC) 38 (also referred to as the "host" or "host computer") via a network 40. In addition to the devices shown herein, the remote devices may include any device capable of hosting a network connection, including information terminals and kitchen management devices. Typically, network 40 may comprise a wired or wireless network, such as networks based on the 802.11a, 802.11b, HPNA, Ethernet, HomeRF, HomePlug, IEEE 1394 (Firewire), etc, standards, or hybrid networks that use two or more of these network standards. Generally, the interactions between a remote device and an extended PC are enabled by host-side software components 42 running on extended PC 38 and a set of software service components running on the remote device. Exemplary software services components are enabled, in part, by Universal Plug and Play (UPnP) modules 44, and include sound service modules 46, display service modules 48, input service modules 50 and video service modules 52.

Figure 3:
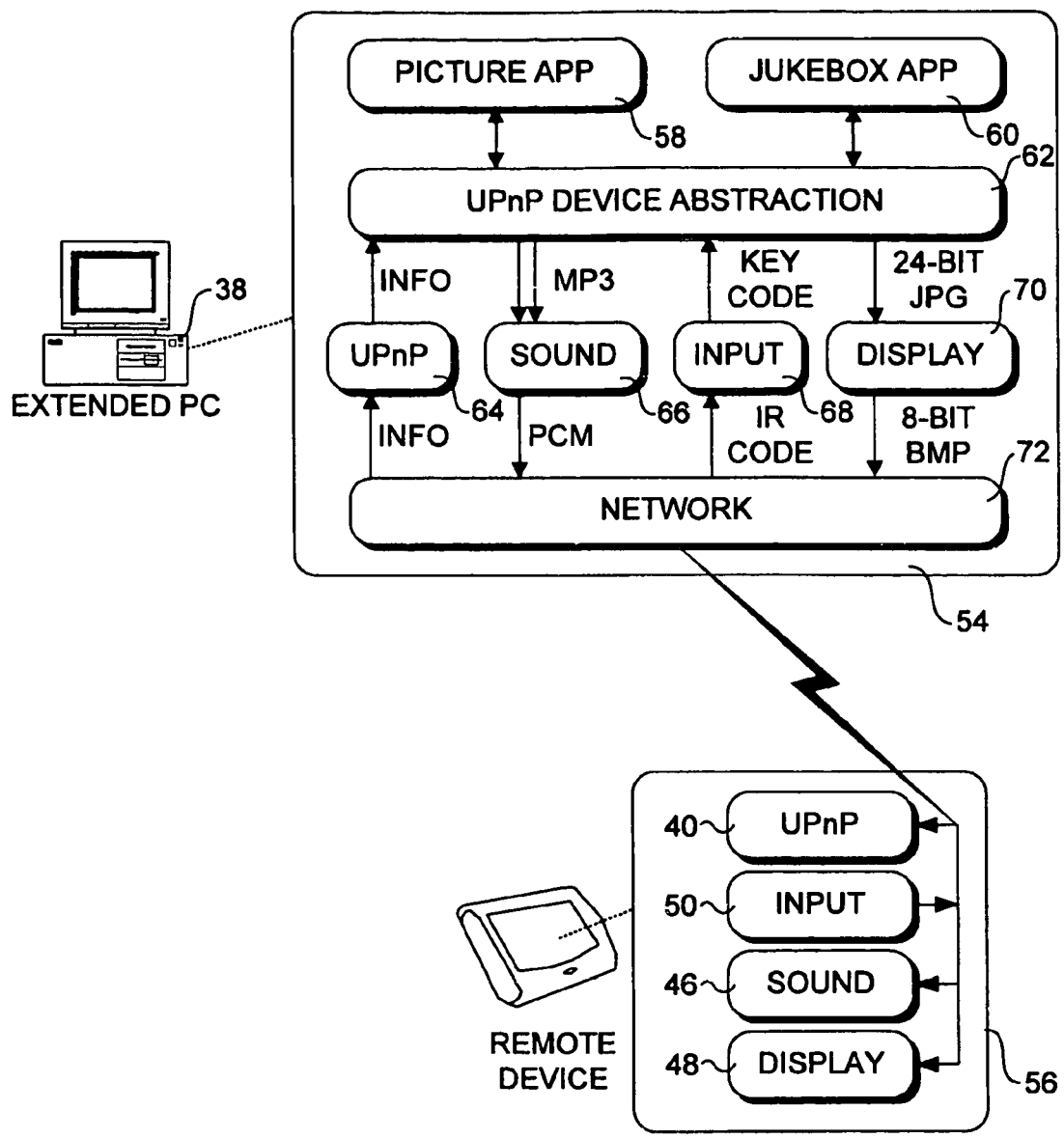
FIG. 3 is a schematic diagram illustrating exemplary host-side and client-side software components to enable an extended PC to interact with a remote device.

An exemplary software architecture that facilitates interaction with a digital network tablet is shown in FIG. 3. The architecture includes host-side software components 54 that interact with client-side components 56. The host-side software components include a picture application 58, a jukebox application 60, a UPnP device abstraction layer 62, a UPnP module 64, a sound module 66, an input module 68, a display module 70, and a network interface module 72. The client-side software services include a UPnP module 40, an input service module 50, a sound service module 46, and display service module 48.

Figure 1:
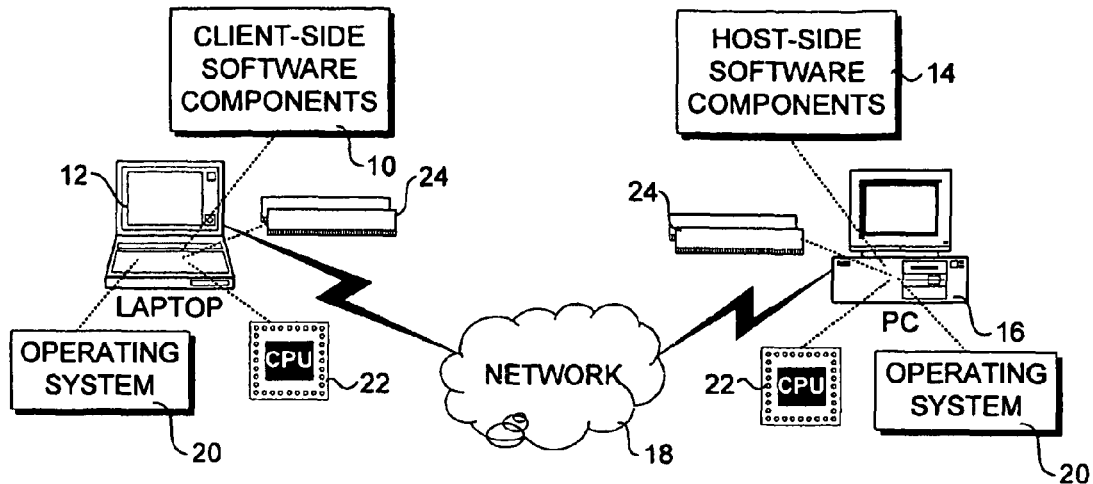
FIG. 1 is a schematic diagram illustrating a conventional architecture that enables a host computer to be accessed via a remote computer.
Figure 4:
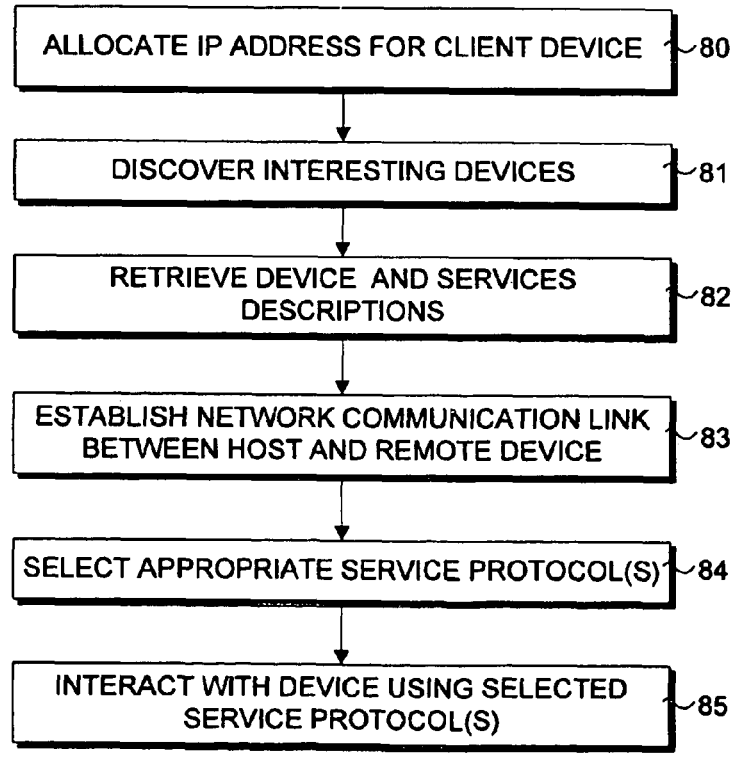
FIG. 4 is a flowchart illustrating operations that are performed to enable interaction between a host computer and a remote device.

A flowchart corresponding to a general high-level use-case of the invention is shown in FIG. 4. In order to enable uni- and bi-directional interactions with remote devices, there needs to be a mechanism to establish network communication between the extended PC and each remote device. As explained below in further detail, this process begins in a block 80 by allocating an IP address for the device, and then using a discovery mechanism that enables devices connected to an appropriate network to be "discovered" in a block 81. After the device has been discovered, description information pertaining to the capabilities of the device and services provided by the device are retrieved in a block 82. Using connectivity data provided by this information, a network communication link is established between the extended PC and the remote device in a block 83.

In general, each device will provide one or more services that may be requested to be performed by other devices on the network. These services may typically include "remote display," "remote audio," "remote input," "remote video," and other similar services. Typically, each service will be designed to interact with a corresponding service component (e.g., software module) running on extended PC 38. For example, for each client-side software service module shown in FIG. 3, there is a corresponding host-side software component running on extended PC 38.

Each of the software components running on extended PC 38 comprise one or more software modules that are specifically-tailored to interact with a corresponding remote device service using a particular service protocol. Depending on the services supported by a given host, corresponding host-side modules and protocols will be selectively loaded and enabled for execution on extended PC 38 in a block 84. Interaction between the host and client devices will then be performed using appropriate service protocols in a block 85.

Establishing Network Connection, Discovery and Retrieving Capabilities Using UPnP In one embodiment, establishing network communication, discovery of devices, and retrieval of those devices' capabilities and services is enabled through Universal Plug and Play. UPnP is an architecture for pervasive peer-to-peer network connectivity that enables network communication between UPnP-enabled devices using zero-configuration, "invisible" networking. Through UPnP, a device can dynamically join a network, obtain an IP address, convey its capabilities, and learn about the presence and capabilities of other devices sharing the network. UPnP leverages Internet components, including IP, TCP, UDP, HTTP, and XML. Like the Internet, contracts are based on wire protocols that are declarative, expressed in XML, and communicated via HTTP. Furthermore, UPnP networking is media independent, does not require device drivers, and can be implemented using any programming language on any operating system.

Figure 5:
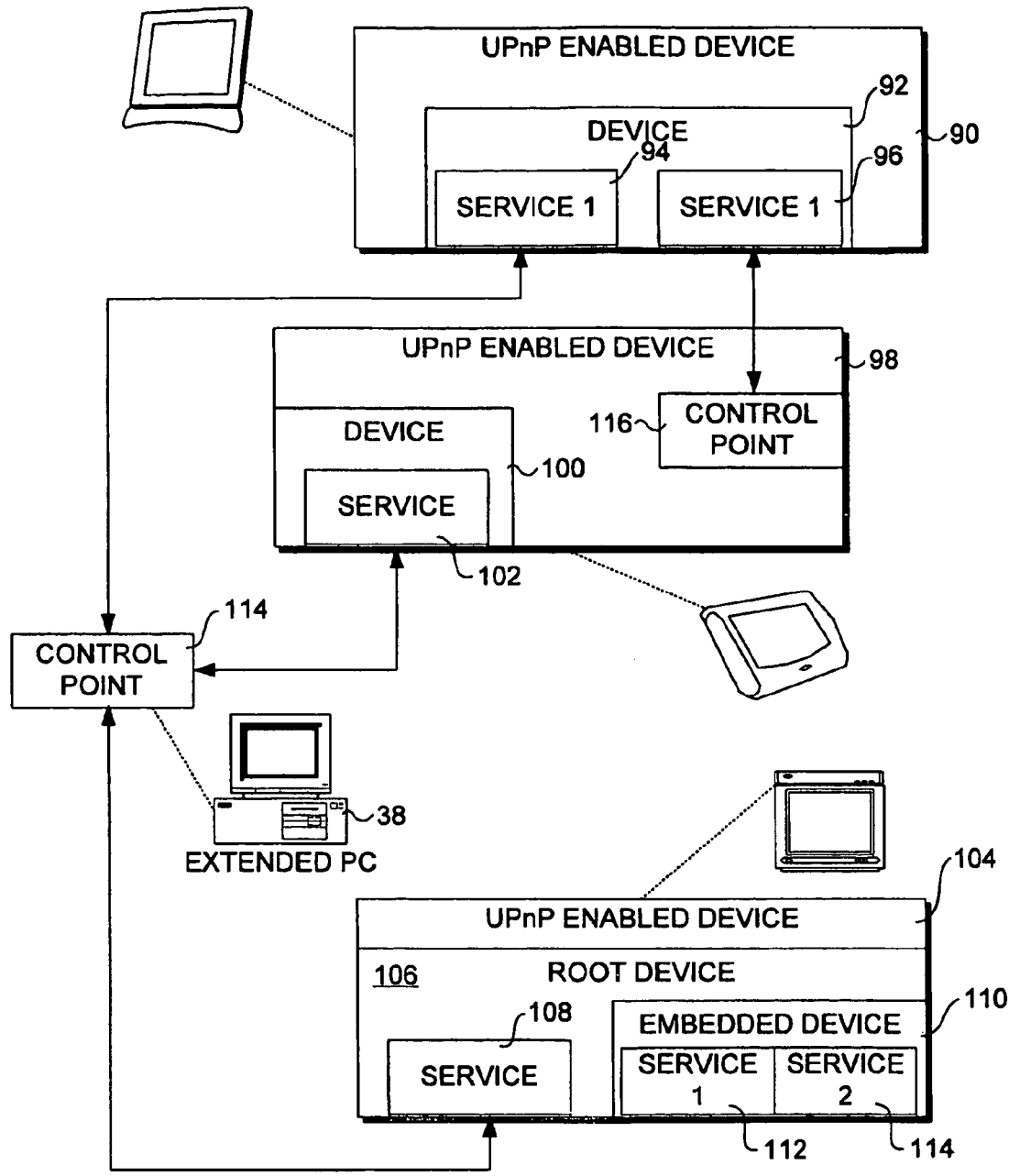
FIG. 5 is a schematic diagram illustrating a plurality of Universal Plug and Play (UPnP)-enabled devices, embedded devices, services, and control points for explaining a typical UPnP environment

The basic building blocks of UPnP networks are devices, services and control points. As shown in FIG. 5, each UPnP-enabled device comprises a container of one or more services and optional nested (i.e., embedded) devices and services. For instance, a UPnP device 90 comprises a single device 92 that provides two services 94 and 96, while a UPnP device 98 comprises a single device 100 that provides a service 102, and a UPnP device 104 that includes a root device 106 that provides a service 108 and an embedded device 110 providing services 112 and 114. Different categories of UPnP devices will be associated with different sets of services and embedded devices. Information identifying a given device, its services, and any embedded devices and their services are provided by an XML description document that is hosted by that device.

The smallest unit of control in a UPnP network is a service. A service exposes actions and models its state with state variables. For instance, a clock service could be modeled as having a state variable, current_time, which defines the state of the clock, and two actions, set_time and get_time, which allow control of the service. Similar to the device description, service information is part of an XML service description standardized by the UPnP forum. A pointer (URL) to these service descriptions is contained within the device description document.

A control point in a UPnP network is a controller capable of discovering and controlling other devices. For example, as shown in FIG. 5, control points include devices used (e.g., solely) to control other devices, as depicted by a control point 114 (e.g., extended PC 38), as well as controllers within devices that may be both controlled by other devices, as depicted by a control point 116. After discovery, a control point may: retrieve the device description and get a list of associated services; retrieve service descriptions for interesting services; invoke actions to control the service; and/or subscribe to the service's event source.

Addressing

The foundation for UPnP networking is IP addressing, which comprises "step 0" in UPnP networking. In one embodiment, each device provides a Dynamic Host Configuration Protocol (DHCP) client that searches for a DHCP server when the device is first connected to the network. If a DHCP server is available (i.e., a managed network exists), the device will use the IP address assigned to it by the DHCP server. If no DHCP server is available (i.e., the network is unmanaged), the device must use automatic IP addressing (Auto-IP) to obtain an address. In brief, Auto IP defines how a device intelligently chooses an IP address from a set of reserved addresses and is able to move easily between managed and unmanaged networks. If during the DHCP transaction, the device obtains a domain name, e.g., through a DNS server or via DNS forwarding, the device should use that name in subsequent network operations; otherwise, the device should use its IP address.

A device that supports AUTO-IP and is configured for dynamic address assignment begins by requesting an IP address via DHCP by sending out a DHCPDISCOVER message. The amount of time this DHCP Client should listen for DHCPOFFERS is implementation dependent. If a DHCPOFFER is received during this time, the device will continue the process of dynamic address assignment. If no valid DHCPOFFERS are received, the device may then auto-configure an IP address. To auto-configure an IP address using Auto-IP, the device uses an implementation-dependent algorithm for choosing an address in the 169.254/16 range. The first and last 256 addresses in this range are reserved and should not be used. The selected address should then be tested to determine if the address is already in use. If the address is in use by another device, another address must be chosen and tested, up to an implementation-dependent number of retries. Preferably, the address selection should be randomized to avoid collision when multiple devices are attempting to allocate addresses.

Once a device has a valid IP address for the network, it can be located and referenced on that network through that address. There may be situations where an end user (e.g., a user of extended PC) needs to locate and identify a device. In these situations, a friendly name for the device is much easier for a human to use than an IP address. Moreover, names are much more static than IP addresses. Clients that refer to a device by name don't need to be modified when IP address of a device changes. Mapping of the device's DNS name to its IP address could be manually entered into DNS database or dynamically configured, if such a facility is provided by the extended PC. While computers and devices supporting dynamic DNS updates can register their DNS records directly in DNS, it is also possible to configure a DHCP server to register DNS records on behalf of these DHCP clients.

Discovery

Figure 6:
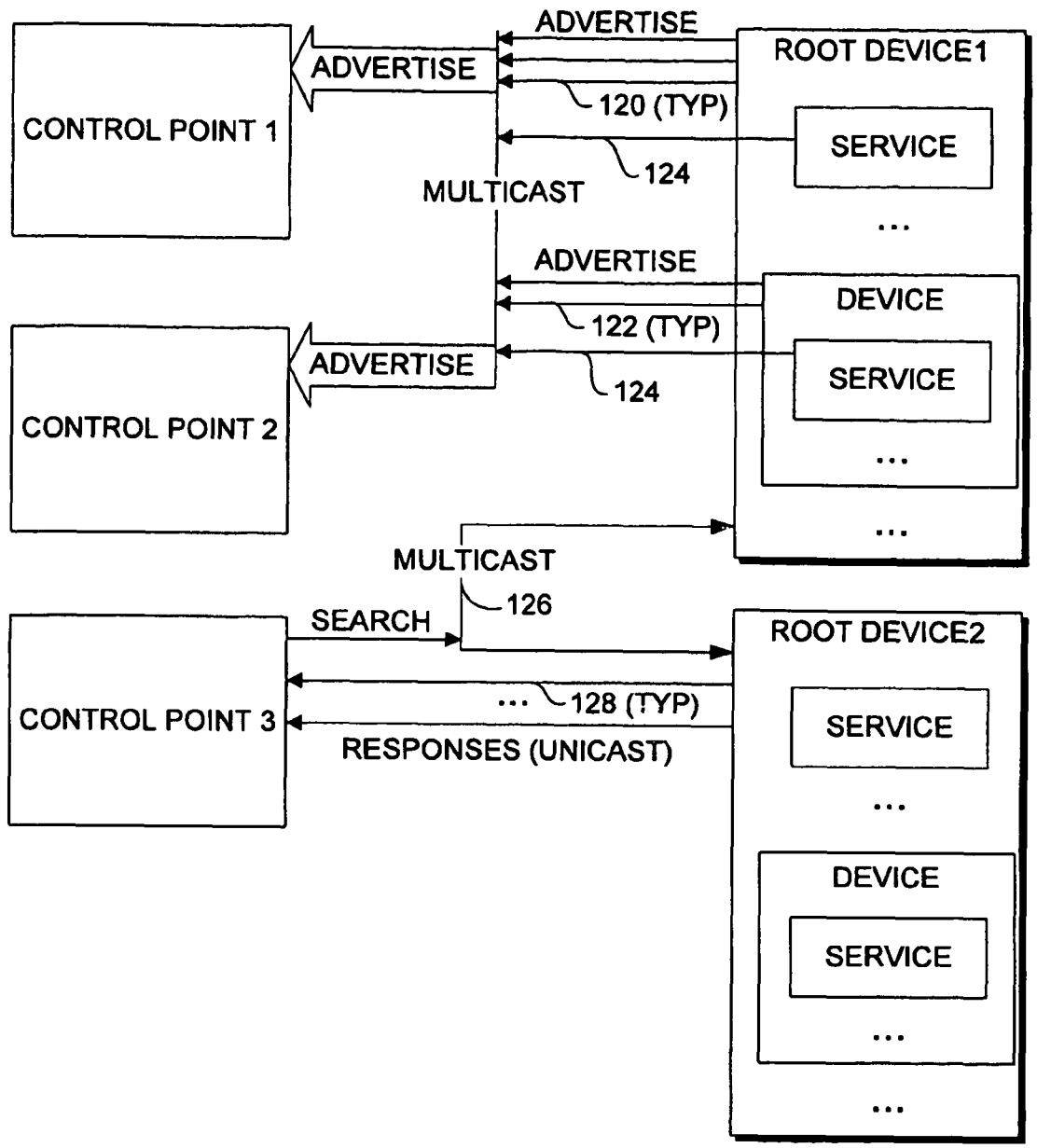
FIG. 6 is a block schematic diagram illustrating UPnP device and service advertisement and control point search mechanisms.

Once an IP address is obtained, discovery (UPnP networking "step 1") may be performed. When a device is added to the network, the UPnP discovery protocol allows that device to advertise its services to control points on the network, as shown in FIG. 6. Control points can also discover services. When a control point is added to the network, the UPnP discovery protocol allows that control point to search for devices of interest on the network. The fundamental exchange in both cases is a discovery message containing a few, essential specifics about the device or one of its services, e.g., its type, identifier, and a pointer to more detailed information.

The UPnP discovery protocol is based on the Simple Service Discovery Protocol (SSDP). SSDP defines how network services can be discovered on the network. SDDP is built on HTTPU and HTTPMU (variants of HTTP defined to deliver messages on top of UDP/IP instead of TCP/IP) and defines methods both for a control point to locate resources of interest on the network, and for devices to announce their availability on the network.

When a device is added to the network, it multicasts discovery messages to advertise its root device, any embedded devices, and its services. Each discovery message contains four major components:

1. A potential search target (e.g., device type), sent in an NT header;
2. A composite identifier for the advertisement, sent in a USN header;
3. A URL for more information about the device (or enclosing device in the case of a service), sent in a LOCATION header; and
4. A duration for which the advertisement is valid, sent in a CACHE-CONTROL header.

To advertise its capabilities, a device multicasts a number of discovery messages. With reference to FIG. 6, a root device will multicast three discovery messages 120 for the root device, two discovery messages 122 for each embedded device, and one discovery message 124 for each service. The content of these messages are shown in FIG. 7.

When a device is added to the network, it must send a multicast request with method NOTIFY and ssdp:alive in the NTS header in the following format, wherein values in italics are placeholders for actual values:

NOTIFY*HTTP/1.1
HOST: 239.255.255.250:1900
CACHE-CONTROL: max−age=seconds until advertisement expires
LOCATION: URL for UPnP description for root device
NT: search target
NTS: ssdp:alive
SERVER: OS/version UPnP/1.0 product/version
USN: advertisement UUID The line HOST: 239.255.255.250:1900 specifies the multicast channel and port reserved for SSDP by the Internet Assigned Numbers Authority. The CACHE-CONTROL value specifies a duration during which the advertisement is valid.

When a device and its services are going to be removed from the network, the device should multicast a ssdp:byebye message corresponding to each of the ssdp:alive messages it multicasted that have not already expired. The following format is used for each message, wherein placeholders for actual values are in italics:

NOTIFY*HTTP/1.1
HOST: 239.255.255.250:1900
NT: search target
NTS: ssdp:byebye
USN: advertisement UUID When a control point is added to the network, the UPnP discovery protocol allows that control point to search for devices of interest on the network. It does this by multicasting a search message 126 with a pattern, or target, equal to a type or identifier for a device or service, as shown in FIG. 6. Responses 128 from devices that respond to the search message contain discovery messages essentially identical to those advertised by newly connected devices, which are unicast.

The multicast request is made with method M-SEARCH in the following format, wherein placeholders for actual values are in italics:
M-SEARCH*HTTP/1.1
HOST: 239.255.255.250:1900
MAN: "ssdp:discover"
MX: seconds to delay response
ST: search target
 The ST: value must be in one of the following formats:
ssdp:all
 Search for all devices and services.
upnp:rootdevice
 Search for root devices only.
uuid:device-UUID
 Search for a particular device. Device UUID specified by UPnP vendor.
urn:schemas-upnp-org:device:deviceType:v
 Search for any device of this type. Device type and version defined by UPnP Forum working committee.
urn:schemas-upnp-org:service:serviceType:v
 Search for any service of this type. Service type and version defined by UPnP Forum working committee.

To be found, a device must send a response to the source IP address and port that sent the request to the multicast channel. Responses to M-SEARCH are intentionally parallel to advertisements, and as such, follow the same pattern as listed for NOTIFY with ssdp:alive discussed above, except that the NT header is replaced with an ST header. The response is sent in the following format, wherein placeholders for actual values are in italics:
HTTP/1.1 200 OK
CACHE-CONTROL: max–age=seconds until advertisement expires
DATA: when response was generated
EXT:
LOCATION: URL for UPnP description for root device
SERVER: OS/version UPnP/1.0 product/version
ST: search target
USN: advertisement UUID
 If the ST header in the request was:
ssdp:all
 Respond 3+2d+k times for a root device with d embedded devices and s embedded services but only k distinct service types. Value for ST header must be the same as the NT header in NOTIFY messages with ssdp:alive. Single URI.
upnp:rootdevice
 Respond once for root device. Must be upnp:rootdevice. Single URI
uuid:device-UUID
 Respond once for each device, root or embedded. Must be uuid:device-UUID. Device UUID specified by UPnP vendor. Single URI.
urn:schemas-upnp-org:device:deviceType:v
 Response once for each device, root or embedded. Must be in the form of urn:schemas-upnp-org:device:deviceType:v. Device type and version defined by UPnP Forum working committee.
urn:schemas-upnp-org:service:serviceType:v
 Response once for each device, root or embedded. Must be in the form of urn:schemas-upnp-org:service:serviceType:v. Service type and version defined by UPnP Forum working committee.

DESCRIPTION

The next step (2) in UPnP networking is description. After a control point has discovered a device, the control point still knows very little about the device. For the control point to learn more about the device and its capabilities, or to interact with the device, the control point must retrieve the device's description from the URL provided by the device in the discovery message. Devices may contain other, logical devices, as well as functional units, or services. The UPnP description for a device is expressed in XML and typically includes vendor-specific, manufacturer information like the model name and number, serial number, manufacturer name, URLs to vendor-specific Web sites, etc. The description also includes a list of any embedded devices or services, as well as URLs for control, eventing, and presentation. For each service, the description includes a list of the commands, or actions, the service responds to, and parameters, or arguments, for each action; the description for a service also includes a list of variables; these variables model the state of the service at run time, and are described in terms of their data type, range, and event characteristics.

The UPnP description for a device is partitioned into two, logical parts: a device description describing the physical and logical containers, and one or more service descriptions describing the capabilities exposed by the device. A UPnP device description includes vendor-specific, manufacturer information like the model name and number, serial number, manufacturer name, URLs to vendor-specific Web sites, etc. (details below). For each service included in the device, the device description lists the service type, name, a URL for a service description, a URL for control, and a URL for eventing. A device description also includes a description of all embedded devices and a URL for presentation of the aggregate.

Figure 8:
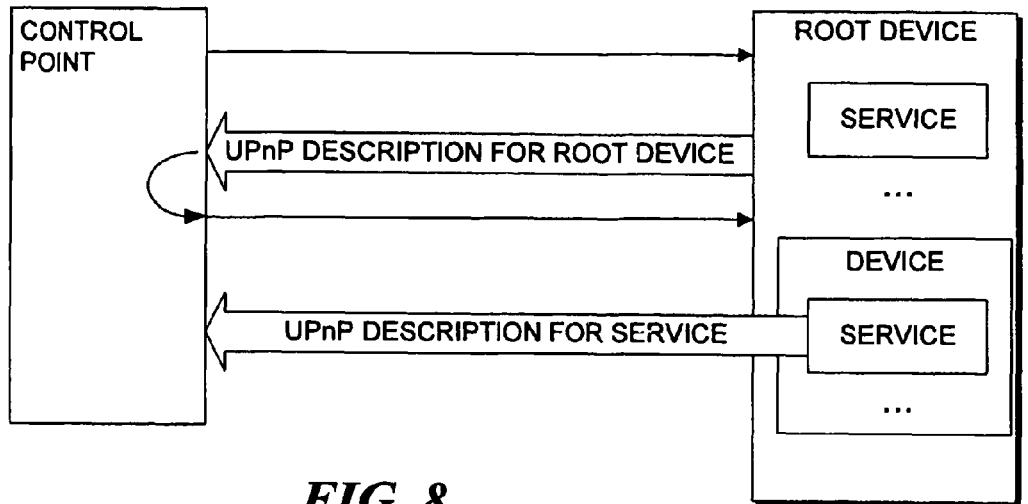
FIG. 8 is a block schematic diagram illustrating how description information is retrieved during a UPnP description step.

Note that a single physical device may include multiple logical devices. Multiple logical devices can be modeled as a single root device with embedded devices (and services), as shown in FIG. 8, or as multiple root devices (perhaps with no embedded devices). In the former case, there is one UPnP device description for the root device, and that device description contains a description for all embedded devices. In the latter case, there are multiple UPnP device descriptions, one for each root device.

A UPnP device description is written in XML syntax and is usually based on a standard UPnP Device Template. A UPnP service description includes a list of commands, or actions, the service responds to, and parameters, or arguments, for each action. A service description also includes a list of variables. These variables model the state of the service at run time, and are described in terms of their data type, range, and event characteristics. This section explains the description of actions, arguments, state variables, and the properties of those variables.

Like a UPnP device description, a UPnP service description is written in XML syntax and is usually based on a standard UPnP Service Template. UPnP vendors can differentiate their devices by extending services, including additional UPnP services, or embedding additional devices. When a control point retrieves a particular device's description, these added features are exposed to the control point. The device and service descriptions authoritatively document the implementation of the device.

Retrieving a UPnP device description is relatively simple: the control point issues an HTTP GET request on the URL in the discovery message, and the device returns the device description. Retrieving a UPnP service description is a similar process that uses a URL within the device description. The protocol stack, method, headers, and body for the response and request are explained in detail below.

As long as the discovery advertisements from a device have not expired, a control point may assume that the device and its services are available. The device and service descriptions may be retrieved at any point since the device and service descriptions are static as long as the device and its services are available. If a device cancels its advertisements, a control point should assume the device and its services are no longer available.

The UPnP description for a device contains several pieces of vendor-specific information, definitions of all embedded devices, URL, for presentation of the device, and listings for all services, including URLs for control and eventing. In addition to defining non-standard devices, UPnP vendors may add embedded devices and services to standard devices. To illustrate these, below is a listing with placeholders in italics for actual elements and values corresponding to a device description.

```
<?xml version="1.0"?>
<root xmlns="urn:schemas-upnp-org:device-1-0">
    <specVersion>
        <minor>1</major>
        <minor>0</minor>
    </specVersion>
    <URLBase>base URL for all relative URLs</URLBase>
    <device>
        <deviceType>urn:schemas-upnp-org:device:deviceType:v
        </deviceType>
        <friendlyName>short user-friendly title</freindlyName>
        <manufacturer>manufacturer name</manufacturer>
        <manufacturerURL>URL to manufacturer site</manufacturerURL>
        <modelDescription>long user-friendly title</modelDescription>
        <modelName>model name</modelName>
        <modelNumber>model number</modelNumber>
        <modelURL>URL to model site</modelURL>
        <serialNumber>manufacturer's serial number</serialNumber>
        <UDN>uuid:UUID</UDN>
        <UPC>Universal Product Code</UPC>
        <iconList>
            <icon>
                <mimetype>image/format</mimetype>
                <width>horizontal pixels</width>
                <height>vertical pixels</height>
                <depth>color depth</depth>
                <url>URL to icon</url>
            </icon>
            XML to declare other icons, if any, go here
        </iconList>
        <serviceList>
            <service>
                <serviceType>urn:schemas-upnp-org:service:
                serviceType:v</serviceType>
                <serviceId>urn:upnp-org:serviceId:serviceId</serviceId>
                <SCPDURL>URL for control</controlURL>
                <controlURL>URL for eventing</eventSubURL>
            </service>
            Declarations for other services defined by a UPnP Forum working
            committee (if any) go here
            Declarations for other services added by UPnP vendor (if any)
            go here
        </serviceList>
        <deviceList>
            Description of embedded devices defined by a UPnP Forum
            working committee (if any) go here
            Description of embedded devices added by UPnP vendor (if any)
            go here
        </deviceList>
        <presentationURL>URL for presentation</presentationURL>
    </device>
</root>
```

The UPnP description for a service defines actions and their arguments, and state variables and their data type, range, and event characteristics. Each service may have zero or more actions, while each action may have zero or more arguments. Any combination of these arguments may be input or output parameters. If an action has one or more output arguments, one of these arguments may be marked as a return value. Each argument should correspond to a state variable. Below is a listing with placeholders in italics for actual elements and values corresponding to a service description.

```
<?xml version="1.0"?>
<scpd xmlns="urn:schemas-upnp-org:service-1.0">
    <specVersion>
        <major>1</major>
        <minor>0</minor>
    </specVersion>
    <actionList>
        <action>
            <name>actionName</name>
            <argumentList>
                <argument>
                    <name>formalParameterName</name>
                    <direction>in xor out</direction>
                    <retval />
                    <relatedStateVariable>stateVariableName</
                    relatedStateVariable>
                </argument>
                Declarations for other arguments defined by UPnP Forum
                working committee (if any) go here
            <argumentList>
        </action>
        Declarations for other arguments defined by UPnP Forum
        working committee (if any) go here
        Declarations for other actions added by UPnP vendor (if
        any) go here
    </actionList>
    <serviceStateTable>
        <stateVariable sendEvents="yes">
            <name>variableName</name>
            <dataType>variable data type</dataType>
            <defaultValue>default value</defaultValue>
            <allowedValueList>
                <allowedValue>enumerated value</allowed value>
                Other allowed values defined by UPnP Forum
                working committee (if any) go here
            </allowedValueList>
        <stateVariable>
        <stateVariable sendEvents="yes">
            <name>variableName</name>
            <dataType>variable data type</dataType>
            <defaultValue>default value</defaultValue>
            <allowedValueRange>
                <minimum>minimum value</minimum>
                <maximum>maximum value</maximum>
                <step>increment value</step>
            </allowedValueRange>
        </stateVariable>
        Declaration for other state variables by UPnP Forum working
        committee (if any) go here
        Declarations for other state variables added by UPnP vendor
        (if any) go here
    </serviceStateTable>
</scpd>
```

Further details of how to implement addressing, discovery and description under UPnP are available through well-publicized documentation, such as that available at the UPnP forum working committee web site (www.upnp.org) and Microsoft's UPnP web site (www.upnp.com).

At this point, the present invention departs from the standard techniques for controlling devices under UPnP, wherein interactions between devices are defined by generalized UPnP control and eventing protocols. Instead, the invention defines service-specific protocols to enable interaction between the extended PC and one or more remote devices that host the services used. In general, these services may include any service provided by a remote device, such as remote display, remote audio, remote input, and remote video; however, the invention is particularly advantageous when considering that in a typical implementation the majority of the hardware and software resources are hosted by the extended PC while the resources required for each remote device are typically "lightweight" in comparison.

Lightweight Remote Display Service

In accordance with one aspect of the invention, a protocol is provided that enables an extended PC to display content on a remote device using a "push" model, wherein the extended PC pushes data and control information to the remote device using a predefined set of commands, and the data is formatted to meet display capabilities advertised by the remote device via the discovery mechanism discussed above. The service provides a simple TCP connection port on which the extended PC sends a stream of "display this picture at position X, Y" type commands An exemplary set of protocol commands corresponding to a lightweight display service are shown below, with accompanying descriptions.

Reset(int ProtocolVersion):

This primitive is used by the extended PC to reset the display on the remote device. The display must clear itself and await instructions. This primitive also clears any state the remote device may have. The protocol is defined with minimal state, but reset is defined such as to future proof the device. If future protocol versions are defined, this command can be used to set which protocol version is going to be used by the extended PC.

Flush(int TimeSinceLastSync)

Some display devices may support double buffering, where the device writes images to a hidden buffer and only displays the hidden buffer to the screen when asked to do so. Double buffering results in less display flicker. The "TimeSinceLastSync" parameter specifies the number of refresh cycles to wait before issuing the Flush command.

For example, suppose an NTSC TV adapter has double buffer support and it keeps track of the screen refresh (about 30 times per second). The device draws display data into its hidden buffer. When it receives a Flush(0) command, it displays the hidden buffer to the screen at the next screen refresh. If it is desired to animate a GIF at 15 frames per seconds, the extended PC will need to send an animation frame to the remote device followed by a Flush(2) command. This will instruct the device to wait 2 refresh cycles before executing the Flush command.

FlushFailed( )

This command allows the PC to kept track of the quality of the animated output and adjust it accordingly. If an animation frame is not received in time due to network and device loads, another mechanism comes into play to allow a PC to adaptively recover: If more than 2 refresh cycles occur before the reception of the Flush(2) command, a FlushFailed( ) command is returned to the PC. This allows the PC to adapt the frame rate and animation size to better fit the current network load and ability of the device.

DrawFillBox(x1, y1, x2, y2, Color)

Draw a fill box of the given color defined by the corner point (x1,y2) and (x2,y2).

DrawImage(x, y, image)

Draw an image at the (x,y) location. Here, the image can be in many different formats. When the PC discovers the remote device on the network, it will retrieve the screen size, color depth and supported image formats for the device's and/or the device service's description information. Information such as image width, height, and color are all encoded within the image format. The extended PC may use special features of some image types, such as alpha-blending and transparency, provided these capabilities are supported by the display device.

Allocate(Area Name, x, y, width, height)

This command may be used in cases where a remote device supports streaming video as a separate service. This command allows the PC to place the video in a portion of the screen. Generally, the PC will set up the position of the video window using a configuration service or protocol, and start streaming the video via a separate streaming service such as UPnP/AV as defined by the UPnP forum.

Repaint( )

On occasion a device may lose the parts of the entire display content. To recover, the device can ask the extended PC to resend a complete update of the screen via the Repaint command.

Move(x1, y1, x2, y2, Width, Height)

This command moves a block from a portion of the frame buffer identified by (X1, Y1, Width, Height) to another portion of the frame buffer identified by (X2,Y2, Width, Height). When using this command, devices may or may not support overlapping areas. If a device does not support this command at all, DrawImage commands are used instead.

In the most basic implementation, only Reset( ) and DrawImage( ) are required commands, while the remaining commands are optional. Perfectly synchronized animations can be played on a display device that supports the Flush( ) and FlushFailed( ) commands, since the device animates the frames based on its own clock. If these commands are not available, the extended PC can still push data and commands to perform an animation, but the quality of the animation is subject to network conditions.

Figure 9:
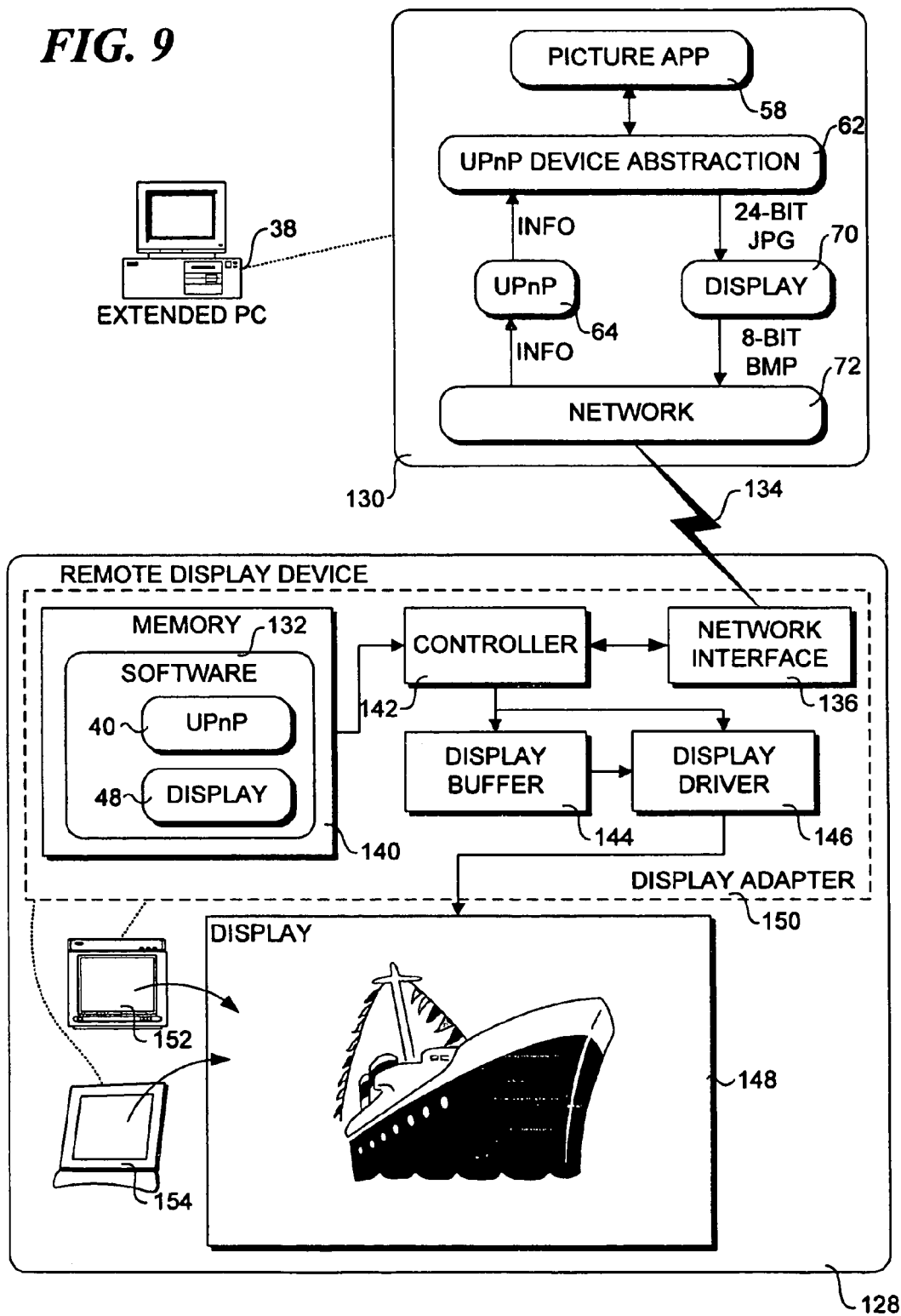
FIG. 9 is a schematic block diagram illustrating an exemplary architecture in accordance with the invention that enables a host computer to display content on a remote device.

An exemplary software/hardware architecture that enables an extended PC 38 to drive a display on a remote display device 128 is shown in FIG. 9. As discussed above, the majority of the hardware and software resources used to implement the lightweight remote display resides on the extended PC. These include various software components 130, including a picture application 58, a UPnP device abstraction layer 62, a UPnP module 64, a display module 70, and a network module 72. Client-side software components 132, depicted as a UPnP service module 40 and a display service module 48, enable network communication and remote display and synchronization to be performed by the remote display device in response to data and commands sent over a network communications link 134 via a network interface 136. In general, network interface 136 may comprise a network interface that supports one or more of the network interface protocols discussed above. Software components 132 will typically be stored as sets of machine instructions in a memory 140 that are executed by a controller 142 to perform the functions of each service. The remote display device also includes a display buffer 144 that stores display data that is read by a display driver 146 to drive a display 148.

Generally, controller 142 may comprise any component enabled to perform the lightweight remote display functions discussed above through execution of software components 132. For example, such components include various types of microprocessors and microcontrollers. Furthermore, memory 140 will typically comprise some form of non-volatile memory, such as ROM, EPROM, Flash memory, etc. In one embodiment, the operations performed by two or more of the hardware components may be provided by an Application Specific Integrated Circuit (ASIC) that is specifically designed to support the services provided by the remote display device.

As shown in FIG. 9, remote display device 128 comprises an integrated device that includes both hardware and software components, as well as display 148. Optionally, the hardware and software components may be employed in a separate display adapter 150 that drives a display. For example, display 148 may comprise a television monitor 152 that receives input from a display adapter. Optionally, display 148 may represent a digital picture frame 154 that is driven by a display adapter.

In most instances, the remote display device will be provided with data corresponding to a bitmap display. This enables the hardware on the display device to be minimized. However, since bitmaps take a large amount of memory and provide an inefficient means for storing image content, most image and video data are stored in some compressed format, such as JPEG and GIF for still images, and MPEG for video images. As a result, when using remote display devices that do not provide built-in decompression capabilities (either through built-in capabilities or provided via client-side software (e.g., display module 48), it will be necessary to convert images from the compressed format into a bitmap format prior to sending the image data to the remote display device. Optionally, if the remote device supports image decompression (either through built-in hardware or the client side software), image data may be sent in a compressed format and decompressed at the remote display device. Compression, decompression, and sending these data are be performed on extended PC 38 through execution of display module 70.

Remote Audio

In addition to driving still image and video displays, the present invention also supports remote audio capabilities. Typically, the UPnP description of an audio service will provide information pertaining to that device's audio capabilities, such as number of channels (i.e., speakers), playback rate, quality (e.g., number of bits), and supported sound format (e.g., PCM), voice input, etc.

Figure 10:
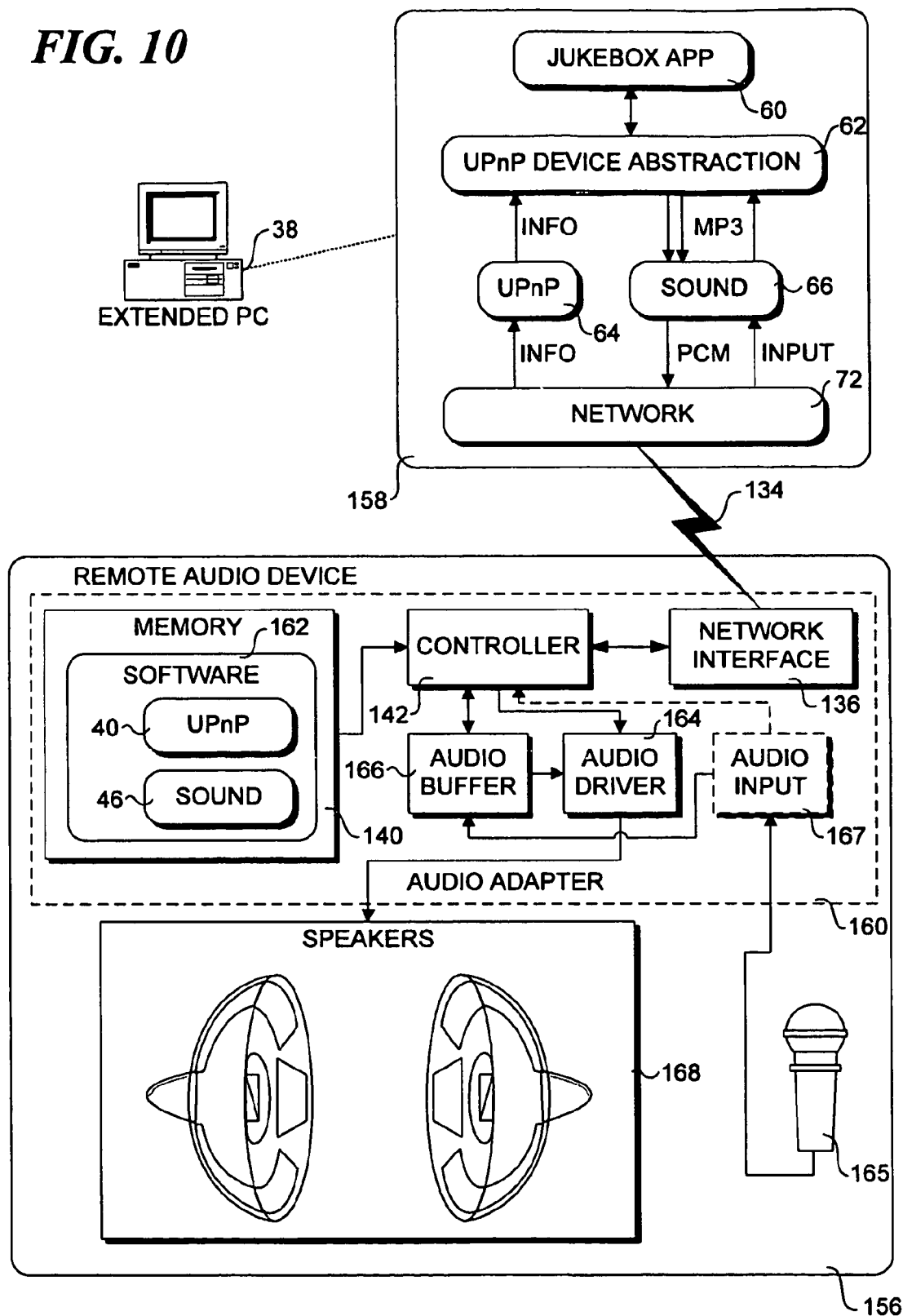
FIG. 10 is a schematic block diagram illustrating an exemplary architecture in accordance with the invention that enables a host computer to send audio content to a remote device and have the audio content played back by the remote device.

An exemplary architecture to enable an extended PC 38 to drive a remote audio device 156 and/or receive audio input from the remote audio device is shown in FIG. 10. A number of software and hardware components used in this architecture are substantially similar to those discussed above with reference to FIG. 9; these components share the same reference numbers in both Figures. A set of software components 158 are running on extended PC 38, including a jukebox application 60 and a sound module 66 in addition to UPnP device abstraction layer 62, UPnP module 64 and network module 72 discussed above. Remote audio device 156 includes an audio adapter 160 that includes software 162 stored in memory 140 that includes a sound service module 46. In addition to network interface 136 and controller 142, the remote audio device also includes an audio driver 164 that reads audio data stored in an audio buffer 166, and converts the audio data into an amplified audio signal that drives speakers 168.

In one embodiment, sound input services are additionally provided by remote audio device 156. In this instance, a user may provide verbal input via a microphone 165, which produces an analog audio signal that is received by an audio input block 167 and converted into audio data having a digital format. Optionally, microphone 165 may directly convert verbal input into the digitized audio data. In one embodiment, audio input block 167 will pass the digitized audio data to audio buffer 166, wherein it will be read by controller 142 and sent to extended PC 38 via network interface 136. Optionally, audio input block 167 may directly pass the digitized audio data to controller 142.

Typically, the user's verbal input will correspond to a set of command words (or a command language with a predefined syntax) that are used as verbal commands to control actions performed by extended PC 38. Accordingly, sound module 66 will include voice recognition software that will be used to interpret the audio data it receives to determine what command(s) the verbal input corresponds to.

In one embodiment, a TCP socket is opened to the remote audio device (via a port number provided by the service's UPnP description). Both the device and the extended PC TCP sockets can be optionally configured to buffer only a small amount of data (depending on desired sound quality, network latency, and/or audio latency). The device simply reads PCM sound from the TCP socket and fills its audio buffer. If the remote sound device cannot perform these operations, it notifies the extended PC that there is a problem. In one embodiment, sound module 66 includes one or more functions that enable the extended PC to adapt the sound quality (defined by its outgoing audio data stream) to meet a remote sound device's playback capabilities in consideration of initial and/or changed network conditions. In one embodiment, the IETF defined RTP protocol (RTP: A Transport Protocol for Real-Time Applications, RFC1889, January 1996) is used to carry PCM encoded audio in real time.

Lightweight Remote Input Service

Devices that may implement the invention can be built using various types of input, from no input at all to pen-input, keyboard, mouse, and button input. Each type of input will generally be handled by a respective input service, wherein the existence and capabilities of each input service will be described in that service's UPnP description information. This information may include type of input device, commands supported (buttons, positions (e.g., pen, mouse position in XY coordinates), clicks, z-axis position), etc.).

Some devices, such as infrared remote controls, might require code running on the extended PC to interpret the time codes it receives from the remote control and convert them into button commands. In this instance, the corresponding UPnP service might also be used to advertise the presence of a custom input device and a URL link where the matching PC software required to support the device is located so that it can be downloaded to the extended PC over the Internet. Once downloaded, the extended PC can run the corresponding software component.

A basic set of primitives is supported by this lightweight remote input service. In one embodiment, these primitives include:

KeyDown(int keydata)
KeyPress(int keydata)
KeyUp(int keydata)

The three keyboard primitives match the well-known keyboard events used is almost all operating systems. KeyDown and KeyUp occur whenever a key is pushed or released, this generally includes all keys including control keys such as shift, ctrl, alt and function keys. The KeyPress event contains the resulting interpretation of the keystrokes such as small and large capitalization and keyboard repetitions.

MouseDown(int x, int y, int buttondata)
MouseMove(int x, int y, int buttondata)
MouseUp(int x, int y, int buttondata)

The three pointer primitives match the well-known keyboard events used is almost all operating systems. These primitives are not limited to mouse movements, any other pointing device such as trackballs, movement keys, pen input, touch sensitive screen and magnetic screens can also use them. During input service discovery, the extended PC is informed of the maximum values of x and y. If the device has a display, these pointer primitives may have a different resolution that may not match the x and y of the display. In such instances, software residing on the extended PC may be used to scale the pointer position to the display.

RemoteControlKey(int buttondata)

The framework also supports a remote control primitive to send to applications button information that is not generally associated with a computer keyboard. These buttons include various buttons that are commonly found on remote control devices used to control audio and video equipment, such as VCRs, DVD players, CD players, jukeboxes, etc. Typically, these buttons will include: Play, Pause, Forward, Reverse, Next Track, VCR, DVD, CD, etc. In some frameworks, the designer may opt to not use this primitive and map these remote control keys to standard computer keyboard events via custom software running on the remote device and/or the extended PC.

Custom(int channel_number, byte[ ] custom_data)

In general, all keyboard, mouse and possibly remote control primitives will be dispatched to applications as-is. For some devices, data processing will need to be performed before a keyboard or mouse event can be generated. In order to lower the cost of the device, it will be preferable that device use this custom primitive to send raw input data to the extended PC for interpretation. The extended PC then sends the raw data into the appropriate code module for interpretation; the code module will generally return mouse or keyboard primitives that can than by dispatched to the applications. In accordance with this primitive, each channel number can contain completely different raw data that may be sent to a different respective code module for interpretation.

In general, a remote device does not have to use all of these primitives, but rather can use all or a subset of them. Some devices may opt to use only custom data as input. An XML file will describe how the input service behaves, what primitive, are used, data identifying the bounds of mouse coordinates, whether custom channels exist and where to obtain the code modules to interpret the raw input data. Preferably, the XML file will be written by the manufacturer of the device and validated using an XML-Schema file (XSD file). The Extended PC can also use the XSD file to validate the devices XML file before it is parsed.

Preferably, the code modules that are loaded and run by the extended PC should be authenticated, especially in instances in which code modules are downloaded from an Internet site. For example, authentication techniques such as digital signatures may be used to authenticate the code modules. Techniques for authentication are well-known in the art, and so no further details are provided herein. The code modules should also be designed to provide system safety. For instance, custom input code modules should be "sand-boxed" such that they are prevented from tampering with system files and other software on the extended PC.

Another instantiation of this remote input service would do a similar operation in reverse. A code module on the extended PC could be loaded to generate a custom command to a device. For example, if a device has an IR transmitter, the PC could load a code module that sends an array of IR pulse timings to the device to be used for re-transmission purposes.

Figure 11:
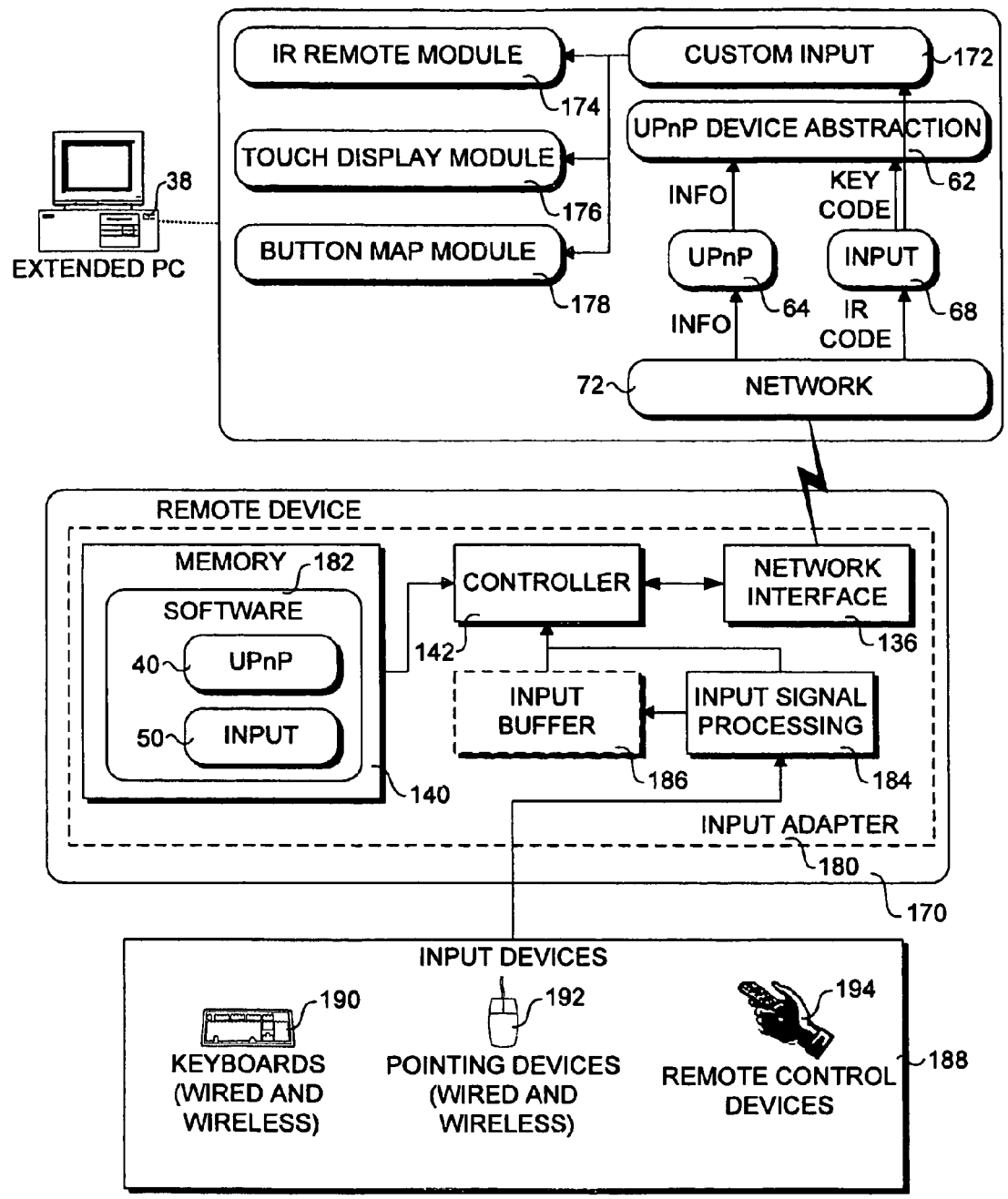
FIG. 11 is a schematic block diagram illustrating an exemplary architecture in accordance with the invention that enables various input devices operatively coupled to a remote device to provide input to a host computer.

An exemplary architecture illustrating host-side and client-side software and hardware components to enable an extended PC 38 to receive input from a remote device 170 is shown in FIG. 11. As before, host-side software components include a UPnP device abstraction layer 62, a UPnP module 64 and a network module 72. New components that support remote device input services include an input module 68, a custom input module 172, an infra-red (IR) remote module 174, a touch display module 176, and a button map module 178.

In a typical implementation, input capabilities will be supported by an input adapter 180 provided for the remote device. The input adapter may comprise circuitry built into the remote device, or may comprise a separate add-on component. As with the display and audio adapters discussed above, the input adapter includes a network interface 136, a controller 142, and memory 140. In this instance, memory 140 includes software 182 comprising a UPnP client-side module 40 and a client-side input module 50. The input adapter further includes an input signal processing block 184, which may be performed by hardware and/or software components that are well-known in the art for processing signals from input devices. Optionally, the input adapter may also include an input buffer 186.

Generally, input adapter 180 will be designed to receive input from one or more input devices 188, which are exemplified by wired and wireless keyboards 190, wired and wireless pointing devices 192, and remote control devices 194.

Figure 12:
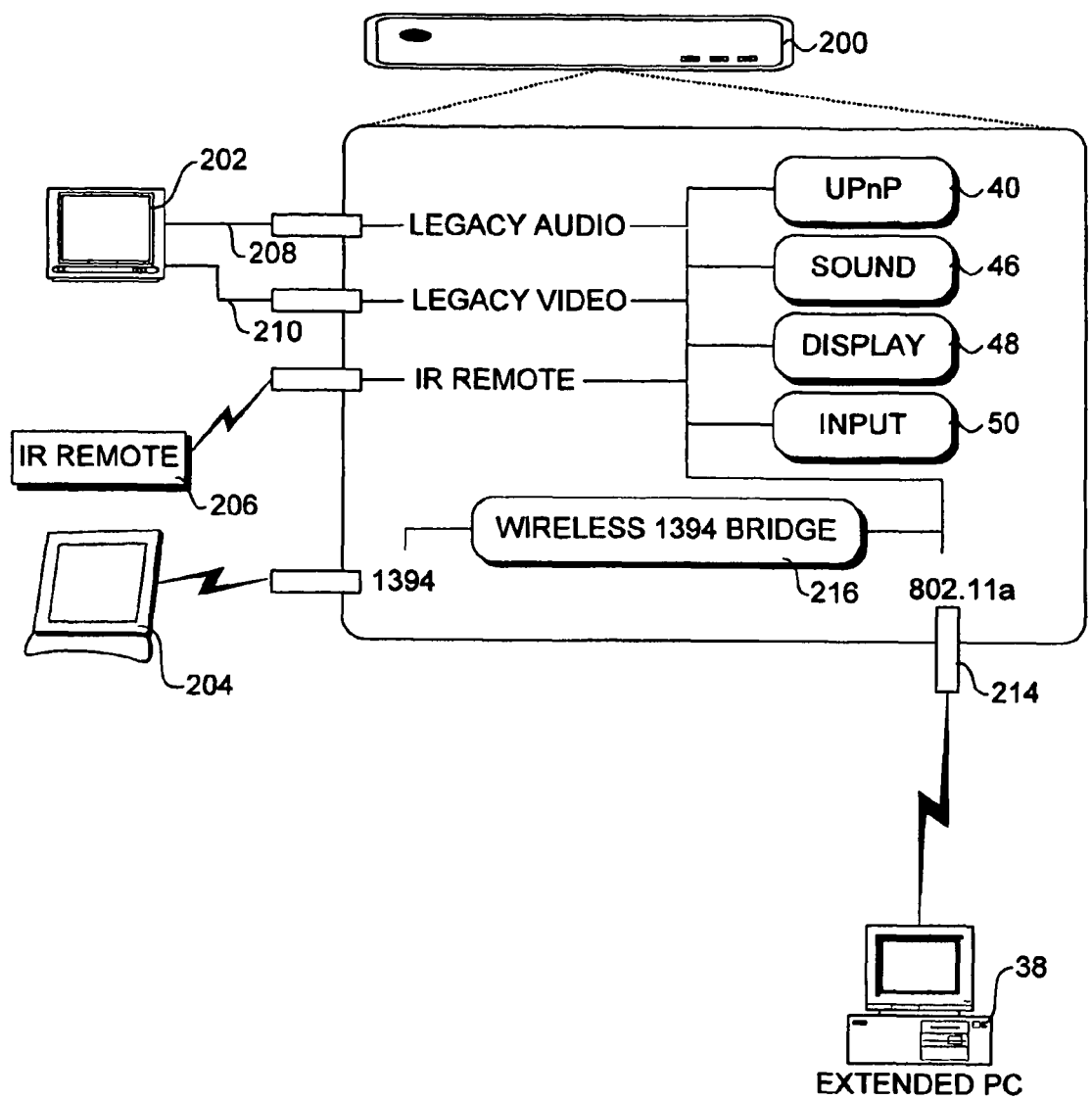
FIG. 12 is a schematic block diagram illustrating an exemplary architecture corresponding to a PC/CE adapter that enables an extended PC to push display and audio content to devices connected to the PC/CE adapter.

An exemplary architecture provided by a PC/CE adapter 200 that implements a plurality of the services discussed above is shown in FIG. 12. In this instance, the PC/CE adapter includes various software components that enable the adapter to interact with an extended PC 38, drive audio and video signals for a television (or television monitor) 202, drive a digital picture frame 204, and receive input from an IR remote control 206. These software components include a UPnP module 40, a sound service module 46, a display service module 48, and an input service module 50. The sound and display service modules interact with appropriate hardware (not shown) to provide analog legacy audio and video signals 208 and 210 to a television 206. Also, digital audio and video signals may be sent using a 1394 link. Display service module 48 also is used to provide bitmap data to digital picture frame 204 via a IEEE 1394 connection 212. The PC/CE adapter is accessed via an IEEE 802.11a wireless connection 214 and provides a IEEE 1394 bridge 216 that enables IEEE 1394 signals to be interfaced with IEEE 802.11a signals.

Exemplary Computer System for Practicing the Invention

Figure 13:
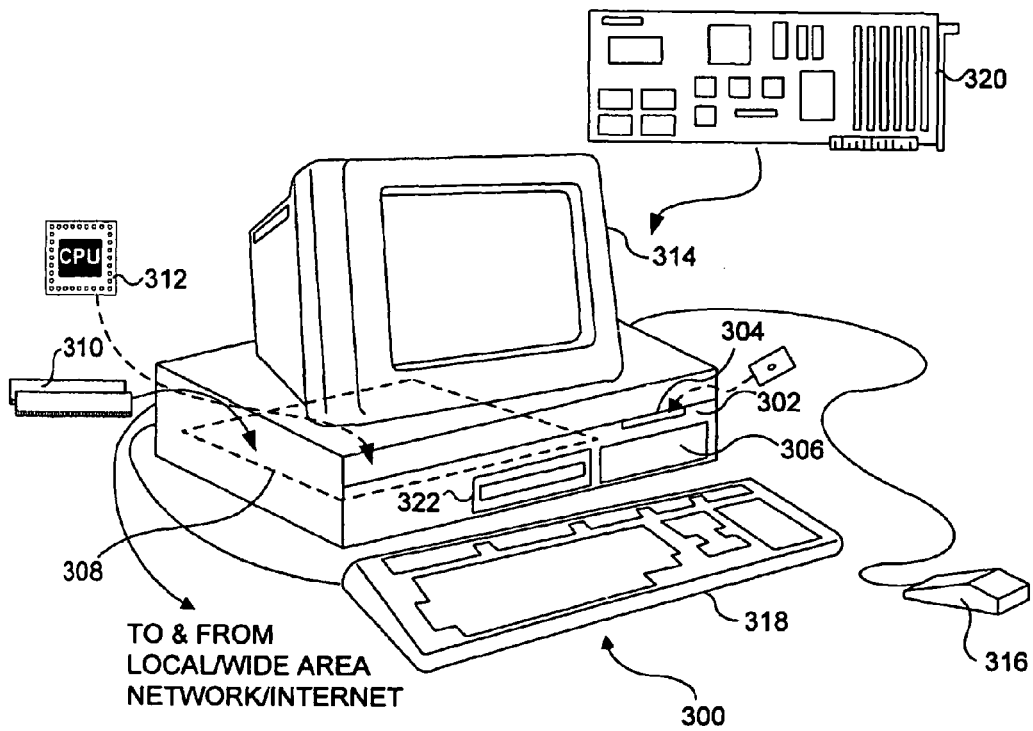
FIG. 13 is a schematic diagram illustrating a personal computer that may be used for an extended PC in accordance with the invention.

With reference to FIG. 13, a generally conventional computer 300 is illustrated, which is suitable for use as the extended PC in connection with practicing the present invention, and may be used for running host-side software comprising one or more software modules that implement the various host-side functions of the invention discussed above. Examples of computers that may be suitable for hosts as discussed above include PC-class systems operating the Windows XP, 2000, or NT operating systems, Sun workstations operating the UNIX-based Solaris operating system, and various computer architectures that implement LINUX operating systems. Computer 300 is also intended to encompass various server architectures, as well as computers having multiple processors.

Computer 300 includes a processor chassis 302 in which are mounted a floppy disk drive 304, a hard drive 306, a motherboard 308 populated with appropriate integrated circuits including memory 310 and one or more processors (CPUs) 312, and a power supply (not shown), as are generally well known to those of ordinary skill in the art. It will be understood that hard drive 106 may comprise a single unit, or multiple hard drives, and may optionally reside outside of computer 300. A monitor 314 is included for displaying graphics and text generated by software programs and program modules that are run by the computer. A mouse 316 (or other pointing device) may be connected to a serial port (or to a bus port or USB port) on the rear of processor chassis 302, and signals from mouse 316 are conveyed to the motherboard to control a cursor on the display and to select text, menu options, and graphic components displayed on monitor 316 by software programs and modules executing on the computer. In addition, a keyboard 318 is coupled to the motherboard for user entry of text and commands that affect the running of software programs executing on the computer. Computer 300 also includes a network interface card 320 or built in network adapter for connecting the computer to a computer network, such as a local area network, wide area network, or the Internet.

Computer 300 may also optionally include a compact disk-read only memory (CD-ROM) drive 322 into which a CD-ROM disk may be inserted so that executable files and data on the disk can be read for transfer into the memory and/or into storage on hard drive 306 of computer 300. Other mass memory storage devices such as an optical recorded medium or DVD drive may be included. The machine instructions comprising the software that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for controlling a remote display device, comprising:

defining a service-specific protocol to facilitate remote control of a service provided by a remote display device, wherein the service-specific protocol defines display commands that are used to display content on the remote display device by sending display commands and data pertaining to the display content from a host computer through a control point to the remote display device over a network communication link, wherein the control point is capable of discovering services provided by a plurality of remote devices, sending data to and receiving data from the host computer and sending data to and receiving data from the remote devices, and wherein the service specific protocol additionally accepts input from the remote display device through the control point to the host computer wherein the input includes feedback primitives that enable the remote display device to provide feedback information to the host computer;

sending data corresponding to the service provided by the remote display device via a host-side software module running on the host computer in a format defined by the service-specific protocol from the host computer through the control point to the remote display device over the network communication link; and sending display commands from the host computer through the control point to the remote display device based on the service-specific protocol indicating how display data is to be displayed on the remote display device and wherein the control commands are capable of causing the display of the data on the remote display device in the indicated manner.

2. The method of claim 1, wherein the service-specific protocol further defines commands that are used to display streaming video on a television by sending streaming video commands and data pertaining to the streaming video content from the host computer through the control point to the remote display device over the network communication link.

3. The method of claim 2, wherein the display of streaming video on the television is in response to a request from a user to display the streaming video.

4. The method of claim 1, wherein data is input to the display device by a user through a remote control device.

5. The method of claim 1, wherein the display device comprises a display input adapter and a television.

6. The method of claim 5 wherein the display input adapter comprises a network interface, a memory, and a display driver.

7. The method of claim 1 wherein the remote display device comprises a television.

* * * * *